United States Patent [19]

Valdez et al.

[11] Patent Number: 4,776,604
[45] Date of Patent: Oct. 11, 1988

[54] STEERABLE PLATFORMED VEHICLE FOR PLAY OR INDUSTRIAL USE

[76] Inventors: Elva R. Valdez; Arthur L. Valdez, both of 8611 W. Verde La., Phoenix, Ariz. 85037

[21] Appl. No.: 135,493

[22] Filed: Dec. 21, 1987

Related U.S. Application Data

[63] Continuation-in-part of Ser. No. 863,098, May 14, 1986, abandoned.

[51] Int. Cl.⁴ .............................................. B62B 11/00
[52] U.S. Cl. ........................ 280/87.04 R; 280/87.04 B
[58] Field of Search ................. 280/263, 270, 281 LP, 280/87.04 R, 87.04 A, 87.04 B

[56] References Cited

U.S. PATENT DOCUMENTS

| | | | |
|---|---|---|---|
| 1,318,847 | 10/1919 | Clockers | 280/87.04 B |
| 1,467,453 | 9/1923 | Remacle | 280/87.04 A X |
| 1,674,272 | 6/1928 | Zander | 280/87.04 R |
| 2,077,274 | 4/1937 | Silkman | 280/87.04 |
| 2,147,732 | 2/1939 | Boynton | 280/281 LP |
| 2,597,748 | 5/1952 | Powell | 280/87.04 R |
| 3,656,777 | 4/1972 | Keiser, Jr. | 280/87.04 B |
| 4,108,460 | 8/1978 | Silva, Jr. | 280/263 X |

Primary Examiner—John J. Love
Assistant Examiner—Michael Mar
Attorney, Agent, or Firm—Harry M. Weiss & Assoc.

[57] ABSTRACT

An improved platformed vehicle having a steerable front wheel is disclosed. The vehicle includes a bifurcated platform with the tail of the platform being divided into first and second branches. Rear wheels are mounted, in pairs, on the underside of each of the branches of the platform. A pair of steerable front wheels are mounted below the platform near the front of the platform. The sprocket wheels are also attached to the underside of the front of the platform. The first sprocket wheel is coupled to the steerable front wheel, while the second sprocket wheel, mounted just behind the first sprocket wheel, is couple to a steering mechanism which passes through the platform. A chain drive couples the two sprocket wheels and thus couples the steering mechanism to the front wheels. The second sprocket wheel has a larger diameter than does the first sprocket wheels so that small turns of the steering mechanism are translated into relatively large changes in the front wheel direction. The steering mechanism is adaptable for play or industrial use. In an industrial application the platform may include a basket for carrying goods.

8 Claims, 2 Drawing Sheets

STEERABLE PLATFORMED VEHICLE FOR PLAY OR INDUSTRIAL USE

This application is a continuation-in-part of U.S. patent application Ser. No. 863,098 filed on May 14, 1986 now abandoned.

BACKGROUND OF THE INVENTION

This invention relates generally to a platformed wheeled vehicle, and more specifically, to a steerable platformed vehicle for use in play or industry having an improved front wheel steering mechanism.

There are a variety of play vehicles of the skateboard, kickboard, or scooter-type in which the rider stands upon a wheeled platform and propels himself by "pushing off" with one foot or the other. Play vehicles of this type generally do not have any direct steering mechanism, or at most have a very rudimentary steering mechanism. The riding of these vehicles has now become very sporting with interest in and even in contests in trick riding, controlled riding, "wheeless", and the like. Also in large industrial warehouses selling goods to the consuming public, clerks often have to retrieve goods from distant locations in the warehouse. The retrieval process generally involves, either walking to the location where the goods are stored using a vehicle such as a bicycle to retrieve the goods These methods, while suitable in some applications, are not satisfactory in others, the control of the steering is desirable when riding down crowded corridors, or perhaps a handy basket to carry the goods being retrieved is needed.

Accordingly, accurate and positive control of the vehicle has become an important and desired feature whether used for play or industry. Also in industrial applications, a carrying means is desirable to carry goods.

It is therefore an object of this invention to provide an improved platformed wheeled vehicle having improved steering control.

It is another object of this invention to provide a highly stable play vehicle having improved, responsive steering control.

It is yet another object of this invention to provide an improved steering mechanism for a platformed vehicle for use in play or industry.

BRIEF SUMMARY OF THE INVENTION

The foregoing and other objects and advantages of the invention are achieved with a platformed vehicle having a steering mechanism with a gear ratio greater than 1. In accordance with one embodiment of the invention, the vehicle includes a bifurcated platform with first and second rear wheels mounted on the other side of the first and second branches of that platform. Steerable front wheels are mounted below the platform near the front coupled to a first sprocket wheel. A second sprocket wheel, mounted behind the first sprocket wheel, is coupled to a steering means which extends above the platform. The first and second sprocket wheels, with the second being larger than the first, are coupled together by a chain drive. The steering means is thus coupled through chain driven sprocket wheels which further drive the front wheels of the vehicle. Variations in the steering means distinguishes the play or industrial application of the invention.

DETAILED DESCRIPTION OF PREFERRED EMBODIMENTS

Figure 1:
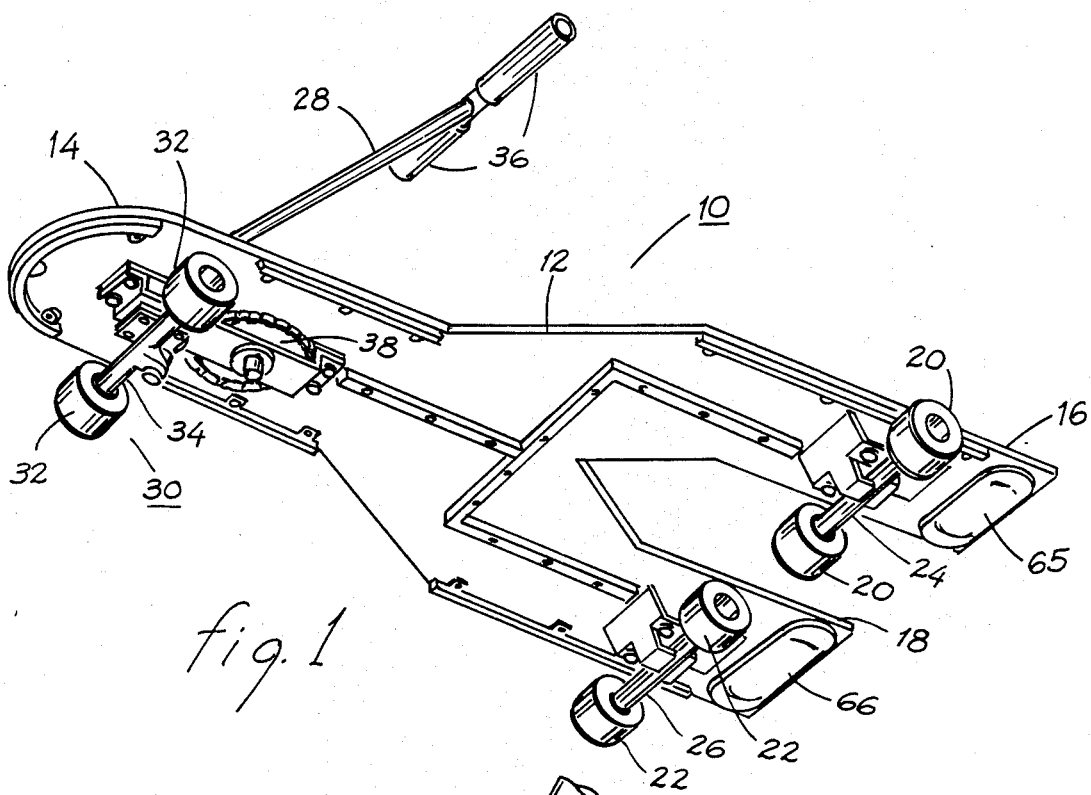
FIG. 1 illustrates, in perspective view, the underside of a play vehicle in accordance with one embodiment of the invention.

FIG. 1 illustrates, in perspective view, a toy vehicle 10 in accordance with the invention, as seen viewed from the bottom. The vehicle includes a bifurcated platform 12 upon which the rider places his feet. Platform 12 includes a single head portion 14 and a split tail portion with two branches 16, 18. The width of the tail portion with the two branches 16, 18 is considerably wider than the width of the head portion. The increased width of the tail portion provides stability to the vehicle. Rear wheels are provided underneath each of the branches of the platform. In this embodiment of the invention, twin wheels, 20, 22 are provided with each of the branches. Wheels 20 are coupled to an axle 24 which is mounted on the underside of branch 16. Wheels 22 are attached to an axle 26 which is mounted to the underside of branch 18. Both axles 24, 26 are mounted in fixed relationship to the underside of the platform; that is, neither of the axles are movable for steering purposes. In a preferred embodiment, axles 24 and 26 are mounted to the underside of the platform through a shock mounting system (not shown) which may include, for example, the series of shock absorbing flexible washers, or the like.

Figure 3:
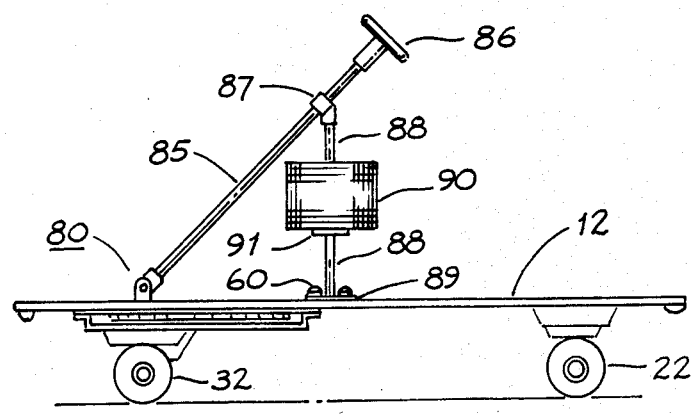
FIG. 3 illustrates a side elevational view, of an industrial vehicle in accordance with another embodiment of the invention.

In accordance with the invention, the vehicle includes a front steering assembly adapted with a steering means which includes a T-bar steering handle 28 with grips 36 for use in a play vehicle embodiment of shaft 85 with steering wheel 86 in an industrial vehicle embodiment, indirectly coupled to a front steering wheel means 30, see generally FIG. 1 or 3. In either play or industrial embodiment of the invention, the front steering wheels means includes two wheels 32 mounted at the ends of a front axle 34 see FIG. 1.

Figure 4:
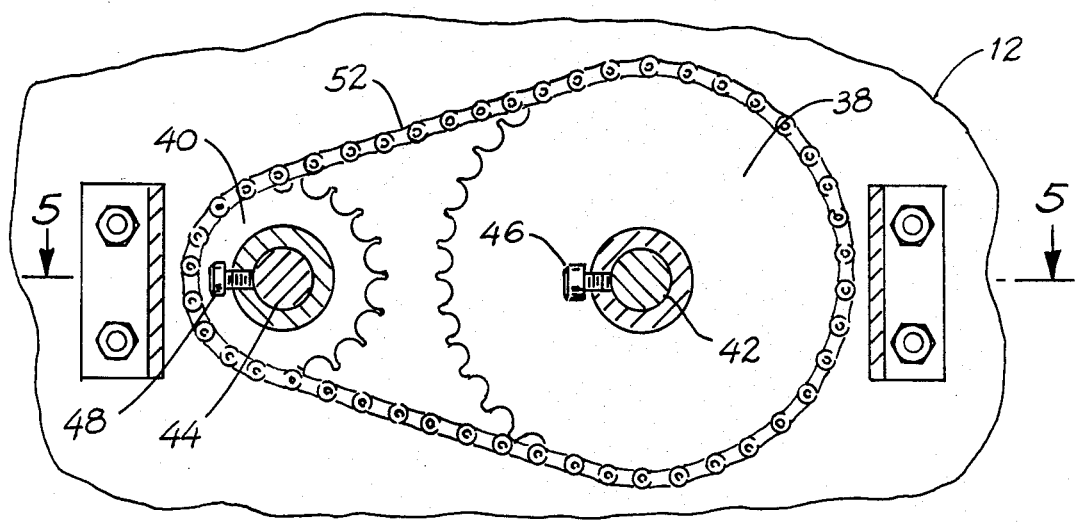
FIG. 4 illustrates, in bottom view, the chain driven sprocket wheels; comprising the steering mechanism of the invention.
Figure 5:
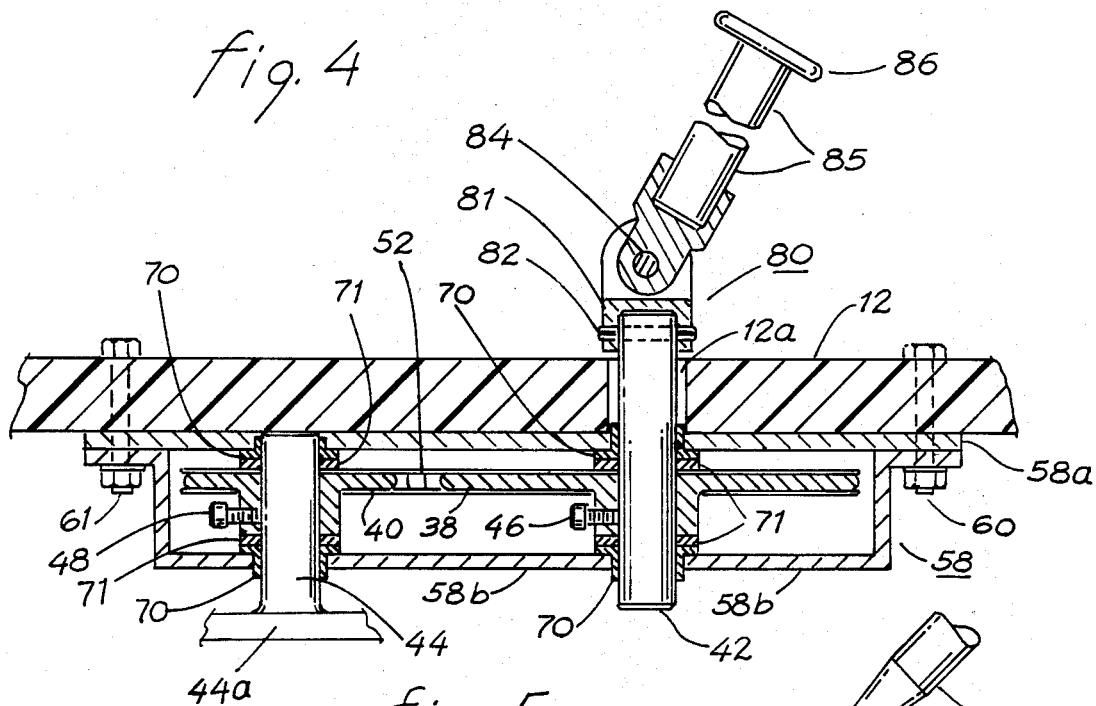
FIG. 5 illustrates a sectional view through the chain driven sprocket assembly showing the attachment of the sprocket assembly to the head portion of the platform and a universal joint used for the steering in the industrial embodiment.
Figure 6:
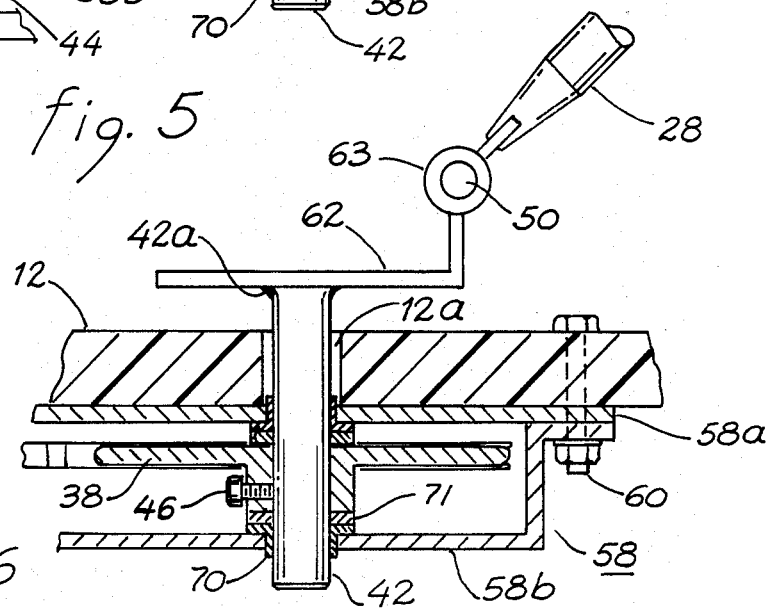
FIG. 6 illustrates, a sectional view, showing the T-bar steering handle interface used in the play vehicle embodiment.

As seen more clearly in FIGS. 2, 4, 5 and 6, the steering arrangement includes two sprocket wheels 38, 40 mounted one behind the other. Sprocket wheel 40 is mounted on a first sprocket axle 44 while sprocket wheel 38 is mounted on a second sprocket axle 42. The sprocket wheels are attached to their respective axle by set screws 46, 48. As is best shown in FIG. 6, in the play vehicle embodiment, axle 42 passes through a brace member 58 and platform 12 and is coupled to T-bar steering handle 28 through a pivot 50. Pivot 50 allows the forward and backward motion of T-bar steering handle 28 to a more or less vertical position. The turning of T-bar steering handle 28 causes axle 42 and thus sprocket wheel 38 to turn. A chain drive 52 couples sprocket wheel 38 to sprocket wheel 40. Therefore, as sprocket wheel 38 turns under the influence of T-bar steering handle 28, chain drive 52 causes sprocket wheel 40 to also turn. FIG. 5 shows how axle 42 interfaces with steering shaft 85 of the industrial embodiment of the present invention. Also shown in FIG. 5 is the mounting of the chain sprocket assembly to the platform 12. This mounting is the same regardless of embodiment. Specifically, axle 42 and 44 pass through openings in brace member 58, comprised of top plate member 58a and lower U-shaped bracket 58b. Brace member 58 is mounted to platform 12 with bolts 60, 61. A bushing 70, is located in each of the clearance holes in brace members 58a and 58b to allow pivoting and firming the fit of axles 42 and 44. Additionally, spacers 71 are added to assure a firm mounting of sprockets 38 and 40 therebetween the brace member. It should be noted that only axle 42 passes through clearance hole 12a in platform 12.

In the industrial model shown in FIG. 5, axle 42 is attached to a U-joint member 80 to facilitate better control in corridors normally found in warehouses.

U-joint 80, being comprised of an axle attachment means 82, a lower U-joint end 81 and pivot 84. Also shown in FIG. 5, axle 44 is pivotally positioned in brace member 58 using bushing 70 in clearance holes in upper brace member 58a and in lower U-shaped brace member 58b. Also spacers 71 are placed at each end of sprocket 40 to reduce vertical movement. It can be seen from FIG. 5 that axle 44 is terminated below the bottom surface of platform 12, and is recessed in a clearance hole in plate member 58a. FIG. 6 shows the steering interface for the play embodiment, where axle 42 is connected to angled plate 62 using welds 43a. Angle plate 62 forms one half of a pivot hinge 63 for T-bar steering handle 28 to pivot at pivot point 50.

Figure 2:
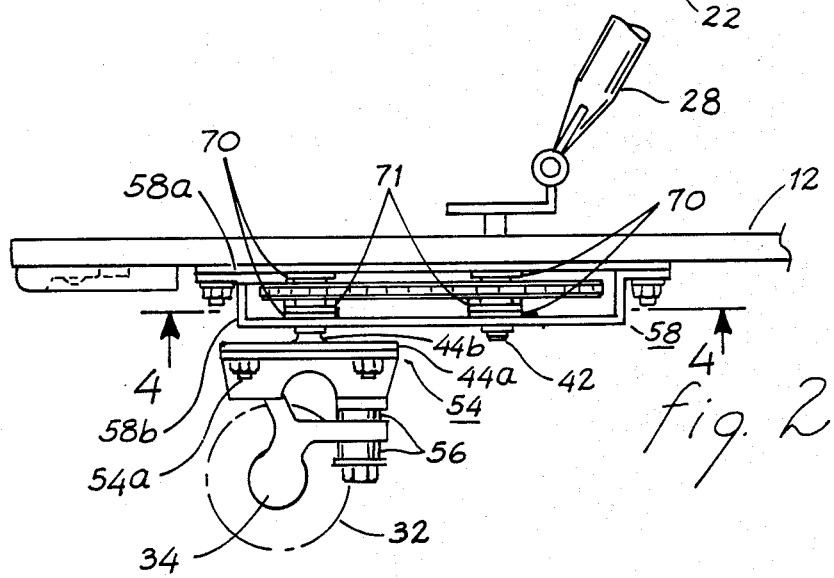
FIG. 2 illustrates a section through the front wheel steering mechanism of the play vehicle embodiment.

Referring now to FIG. 2, Front axle 34 is mounted to a mounting platform, generally shown as 54, which is, in turn, coupled to axle platform member 44a at axle neck 44b using bolts 54a. Preferably axle 34 is mounted to mounting platform 54 which has a series of resilient washers 56 which provides a shock absorbing quality to the axle mounting. Axle 34 is thus directly coupled to sprocket axle 44 and turns with sprocket wheel 40. As seen in FIG. 4, sprocket wheel 38 has a diameter greater than the diameter of sprocket wheel 40 so that the turning of sprocket wheel 38 through a given angle causes sprocket wheel 40 to turn to a greater angle. A small turning motion imparted to T-bar steering handle 28 or steering wheel 86 is thus magnified by the gearing mechanism to cause a greater turning of axle 34 and the wheels 32 mounted thereon. Preferably sprocket wheel 38 has a diameter of approximately 1.5-2.0 times as great as the diameter of sprocket wheel 40. The gearing of the front wheels steering mechanism makes the steering of the vehicle very responsive to even small changes imparted to steering means 28 of 86.

Referring now to FIGS. 1 and 3, where it can be seen that head 14 of platform 12 is narrower than the bifurcated tail section, which has an overall width more than twice the width of the head. The wide tail combined with the geared steering mechanism and the narrow head provide stability combined with quick-easy maneuverability. The play vehicle embodiment further comprises bumper pads 65, 66 mounted at the ends of the branches 16, 18 respectively. Steering handle 28, besides making the vehicle highly maneuverable, also aids in pulling the head of the vehicle out of contact with the ground for stunt maneuvers. During such stunt maneuvers, the bumper pads 65, 66 provide a stop as the head of the board is lifted and the tail touches the ground. Also, as illustrated in FIG. 3, the industrial embodiment of the invention is provided with a U-joint type of steering, designated as 80, having a shaft 85 coupled to a vertical post 88, which is mounted to platform 12 using a mounting plate 89 and bolts 60. Shaft 85 will rotate about shaft bearing 87. Steering wheel 86 allow 360 degree rotation using U-joint 80. This industrial embodiment offers even better maneuverability and additionally is provided with a goods carrying means 90 supported on post plate 91 attached to post 88.

Thus it is apparent that there has been provided, in accordance with the invention, a stable and highly maneuverable steerable platformed vehicle which fully meets the objects and advantages set forth above. Although the invention has been described and illustrated with reference to specific embodiments thereof, it is not intended that the invention be limited to these illustrative embodiments. Those skilled in the art, will recognize, after review of the foregoing detailed description, that variations and modifications are possible without departing from the spirit of the invention. For example, other wheel arrangements having more or less than the two wheels per axles as illustrated may be employed. Further, the wheel axles as well as the sprocket axles can be mounted differently on the underside of platform 12 and still achieve similar results to those achievable with the illustrated embodiment. Accordingly, it is intended to encompass within the invention all such variations and modifications as fall within the scope of the appended claims.

We claim:

1. An improved platformed vehicle apparatus, said apparatus comprising:
   (a) a wheeled platform, said wheeled platform having a head portion and tail portion;
   (b) a chain driven sprocket assembly mounted beneath said head portion of said wheeled platform, said chain driven sprocket assembly comprising:
   a brace member;
   a first sprocket axle,
   a second sprocket axle,
   a plurality of bushings,
   a plurality of spacers,
   a first sprocket wheel, adapted to be mounted on said first sprocket axle,
   a second sprocket wheel, adapted to be mounted on said second sprocket axle, and
   a drive chain,
   said brace member including a U-shaped bracket member and an upper plate member, said upper plate member being fixedly mounted to the lower surface of said head portion, said U-shaped bracket member and said upper plate member being spaced apart and provided with a plurality of clearance holes for allowing said first and second sprocket axles to pass therethrough and to allow the arrangement and placement of said first and second sprocket wheels between said U-shaped bracket and said upper plate member, said plurality of bushings extending through said plurality of clearance holes in said brace member and said upper plate member, wherein said plurality of spacers and said plurality of bushings permit pivotal movement of said first and second sprocket axles within said clearance holes, said first sprocket axle having an upper end abutting the lower surface of said head portion, and said second sprocket axle extending through an aperture in said head portion, the upper end of said second sprocket axle being located above said platform;

(c) a front wheel assembly, said front wheel assembly including a front axle, wheels, shock absorption washers and a mounting platform, said mounting platform being mechanically mounted to said first sprocket axle; and (d) a steering mechanism, said steering mechanism being mechanically connected to said upper end of said second sprocket axle.

2. An improved platformed vehicle apparatus as recited in claim 1, wherein:

said first and second sprocket axles are located along a longitudinal central axis of said wheeled platform, said first sprocket axle being mounted forward of said second sprocket axle.

3. An improved platformed vehicle apparatus as recited in claim 1, wherein:

said first sprocket wheel is removably attached to said first sprocket axle therebetween said upper plate member and said U-shaped bracket member.

4. An improved platformed vehicle apparatus as recited in claim 1, wherein:

said steering mechanism includes a T-shaped steering handle pivotally attached to said second sprocket axle.

5. An improved platformed vehicle apparatus as recited in claim 1, wherein:

said steering mechanism includes a universal joint member attached to said second axle, a steering shaft member and a steering wheel.

6. An improved platformed vehicle apparatus as recited in claim 5, wherein:

a carrying means for carrying articles is attached to said steering shaft member.

7. An improved platformed vehicle apparatus as recited in claim 1, wherein:

said drive chain is operatively coupling said first and second sprocket wheels, said first sprocket further coupling said front wheel assembly, said first sprocket wheel has a first diameter, said second sprocket wheel has a second diameter, said second diameter being greater than said first diameter, and said second diameter thus enabling improved turning response of said front wheel assembly.

8. An improved platformed vehicle apparatus as recited in claim 1, wherein:

said tail portion is a bifurcated tail portion, said bifurcated tail portion being provided with wheels having a shock absorption system.

* * * * *